(12) United States Patent
Kobayashi et al.

(10) Patent No.: US 7,823,714 B2
(45) Date of Patent: Nov. 2, 2010

(54) FRICTION PLATE FOR WET-TYPE MULTIPLATE CLUTCH

(75) Inventors: Masahiro Kobayashi, Fukuroi (JP); Hiroyuki Kinpara, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 378 days.

(21) Appl. No.: 11/964,187

(22) Filed: Dec. 26, 2007

(65) Prior Publication Data

US 2008/0190727 A1  Aug. 14, 2008

(30) Foreign Application Priority Data

Feb. 9, 2007  (JP) .............................. 2007-029947
Feb. 21, 2007  (JP) .............................. 2007-040129

(51) Int. Cl.
*F16D 13/74* (2006.01)

(52) U.S. Cl. .............................. 192/113.36; 192/70.12; 192/107 R

(58) Field of Classification Search ............. 192/113.36
See application file for complete search history.

(56) References Cited

U.S. PATENT DOCUMENTS 4,726,455 A * 2/1988 East ....................... 192/107 R
6,062,367 A 5/2000 Hirayanagi et al.
6,499,579 B2 * 12/2002 Ono et al. ............... 192/113.36
7,014,027 B2 * 3/2006 Adair et al. ............. 192/113.36
7,172,062 B2 2/2007 Kitahara et al.
2007/0017773 A1 1/2007 Suzuki et al.
2007/0199794 A1 8/2007 Miyazaki et al.
2008/0179161 A1 * 7/2008 Kobayashi et al. ...... 192/107 R

FOREIGN PATENT DOCUMENTS

JP  11-141570  5/1999
JP  2005-076759  3/2005

* cited by examiner

*Primary Examiner*—Richard M. Lorence
(74) *Attorney, Agent, or Firm*—Kenealy Vaidya LLP

(57) ABSTRACT

A friction plate for a wet-type multiplate clutch is provided with a core plate and friction linings bonded on opposite sides of the core plate, respectively. Each of the friction linings is composed of plural segment pieces each having at least one first oil groove and at least one second oil groove. The first oil groove opens to a radially-inner side of the friction plate and has a closed end portion located in a radially-intermediate part of the friction lining, and the second oil groove opens to a radially-outer side of the friction plate and has a closed end portion located in another radially-intermediate part of the friction lining. The second oil groove has a shape that its angular width becomes narrower from its open end portion toward its closed end portion thereof, and at the open end portion, the angular width of the second oil groove is reduced. The first oil groove may be provided with an oil pocket at its closed end portion.

11 Claims, 6 Drawing Sheets

FRICTION PLATE FOR WET-TYPE MULTIPLATE CLUTCH

CROSS-REFERENCE TO RELATED APPLICATION

This application claims the priorities of Japanese Patent Application 2007-029947 filed Feb. 9, 2007 and Japanese Patent Application 2007-040129 filed Feb. 21, 2007, both of which are incorporated herein by reference.

FIELD OF THE INVENTION

This invention relates to a friction plate for a wet-type multiplate cutch useful as a clutch, brake or the like in an automatic transmission.

BACKGROUND OF THE INVENTION

FIG. 1 is a cross-sectional view illustrating the fundamental construction of a wet-type multiplate clutch 10. FIG. 1 shows a clutch casing 21, a counterpart hub 22 to which a torque is transmitted, a spline groove 23 formed on the clutch casing 21, a spline groove 24 formed on the hub 22, a piston 25 for pressing separator plates 30 and friction plates 40 against a backing plate 26, a snap ring 27 supporting the backing plate 26, and a sealing ring 28 for the piston 25. The separator plates 30 are maintained in fitting engagement with the spline groove 23, while the friction plates 40 are maintained in fitting engagement with the spline groove 24.

In recent years, there is an ever-increasing demand for improvements in the fuel economy of automobiles. Keeping in step with this trend, there is an outstanding demand for a further reduction in drag toque between friction plates and separator plates during non-engagement of a clutch in an automatic transmission.

Conventional clutches are equipped with friction plates provided with friction linings, each of which has one or more oil grooves having closed end portions to separate the friction plates from their associated separator plates during non-engagement of a clutch and also has one or more oil passages extending radially through the friction lining to feed lube oil onto a friction surface for the prevention of seizure during engagement of the clutch.

To improve the shift response in an attempt to make not only an improvement in fuel economy and but also improvements in engine performance, the clearances between friction plates and their associated separator plates have become smaller recently than before, tending to result in a greater drag torque due to intervening oil films during idling.

With such conventional friction plates, no sufficient drainage of lube oil is feasible on their friction surfaces, thereby failing to satisfactorily meet the demand for a further reduction in drag torque. Especially during rotation in a low-speed range, the drainage of intervening lube oil between the friction plates and the associated separator plates is not sufficient so that the drag torque cannot be reduced.

Lube oil is fed from the radially-inner side of friction plates, and is then drawn onto their friction surfaces. Once the thus-drawn lube oil enters between the friction plates and their associated separator plates, its drainage does not take place quickly. Especially when the clearances between the friction plates and the separator plates are small and the clutch is in a low rpm range, this tendency is pronounced so that during idling, a significant drag torque is produced due to the viscosity of the lube oil between the friction linings and their counterpart separator plates.

When the friction surface of each friction lining is provided with plural second oil grooves opening to a radially-outer side of the friction lining and closed at an opposite end portion thereof (hereinafter called "second oil grooves"), lube oil which has been drawn onto the friction surface from an oilway is smoothly drained to the radially-outer side so that during idling, a drag torque can be reduced. This drag-torque reducing effect is high especially during low-speed rotation. Because the drawn lube oil is smoothly drained, frictional heat which is produced during clutch engagement is also removed smoothly together with the lube oil, so that the heat resistance of the friction lining is improved.

When the friction surface of each friction lining is provided with plural first oil grooves opening to a radially-inner side of the friction lining and having closed radial outer end portions (hereinafter called "first oil grooves"), these oil grooves are effective in keeping uniform the clearances between the friction plates and their associated separator plates during idling owing to the action that separate the friction plates and the separator plates from each other and, when the clutch is disengaged, can smoothly separate the friction plates and the separator plates from each other. These oil grooves are, therefore, also effective in reducing a drag torque during idling.

When a friction lining having these oil grooves is formed into segment pieces and these segment pieces are bonded at angular intervals on one side of a core plate, oil passages are formed between the respective segment pieces such that the oil passages extend through the friction lining from the radially-inner side to the radially-outer side. Accordingly, any extra lube oil is promptly drained through the oil passages, thereby very effectively reducing a drag torque during idling. (See, for example, JP-A-11-141570 and JP-A-2005-76759)

In an initial stage of clutch engagement, however, the lube oil which exists on each friction surface is quickly drained from the friction surface via these oil grooves and oil passages, and therefore, the cushioning effect of the lube oil is reduced to cause abrupt grabbing of the clutch in the initial stage of clutch engagement. The use of this clutch as a clutch, brake or the like in an automatic transmission causes a problem that a shock is produced when the automatic transmission is shifted.

SUMMARY OF THE INVENTION

As mentioned above, with the conventional friction plates, lube oil is quickly drained from their friction surfaces so that the cushioning effect of the lube oil is reduced to cause grabbing. The use of such conventional friction plates as a clutch or brake in an automatic transmission unavoidably results in the problem that shift shocks are produced. There is, accordingly, an ever-increasing need for friction plates which can avoid grabbing in an initial stage of engagement while reducing a drag torque during idling of the clutch.

To solve the above-described problem, the present invention provides, in a first aspect thereof, a friction plate for a wet-type multiplate clutch, said friction plate being provided with a core plate and friction linings bonded on opposite sides of the core plate, respectively, each of the friction linings being composed of plural segment pieces bonded at angular intervals on its corresponding one of the opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of its corresponding segment piece and having a closed end portion located in another radially-intermediate part of the corresponding segment piece, wherein the second oil groove has a shape that its angular width becomes narrower from an open end portion thereof toward the closed end portion thereof, and at the open end portion, the angular width of the second oil groove is reduced.

In a second aspect of the present invention, there is also provided a friction plate for a wet-type multiplate clutch, said friction plate being provided with a core plate and friction linings bonded on opposite sides of the core plate, respectively, each of the friction linings being composed of plural segment pieces bonded at angular intervals on its corresponding one of the opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of its corresponding segment piece and having a closed end portion located in another radially-intermediate part of the corresponding segment piece, wherein the first oil groove is provided with an oil pocket at the closed end portion thereof, the second oil groove has a shape that its angular width becomes narrower from an open end portion thereof toward the closed end portion thereof, and at the open end portion of the second oil groove, the angular width of the second oil groove is reduced.

The use of friction plates according to the first or second aspect of the present invention in a clutch makes it possible to reduce a drag torque during idling and also to prevent grabbing in an initial stage of clutch engagement so that, when the clutch is employed in a transmission, a shift shock can be avoided.

Even under such a lubrication environment that lots of lube oil are fed, the clutch equipped with the friction plates according to the first or second aspect of the present invention can prevent grabbing in an initial stage of clutch engagement while reducing a drag torque during idling.

DETAILED DESCRIPTION OF THE INVENTION AND PREFERRED EMBODIMENTS

In the first aspect of the present invention, the oil-draining effect of each second oil groove opening to the radially-outer side of its corresponding segment piece increases when its angular width is made greater from its closed end portion toward the radially-outer side. Each first oil groove opening to the radially-inner side of its corresponding segment piece becomes more effective for separating the friction plate from its associated separator plate when its angular width is made narrower from its open end portion toward its closed end portion.

In each of the first and second aspects of the present invention, each second groove may preferably be provided at its open end portion with a protuberance on one of its radially-outer side wall and radially-inner side wall to reduce the angular width of the open end portion. Further, the closed end portions of each first and second oil grooves may preferably be located beyond a radial center line of their corresponding segment piece, respectively.

In the second aspect of the present invention, the angular width of each first oil groove may preferably become narrower from its open end portion toward its corresponding oil pocket.

The shapes of the oil passages and the first and second oil grooves in each friction lining can be appropriately determined depending upon the friction surface area, friction characteristics, lube-oil feed rate, and so on. In the second aspect, each oil pocket can also be formed in a desired appropriate shape, specially in a circular or rectangular shape.

Figure 1:
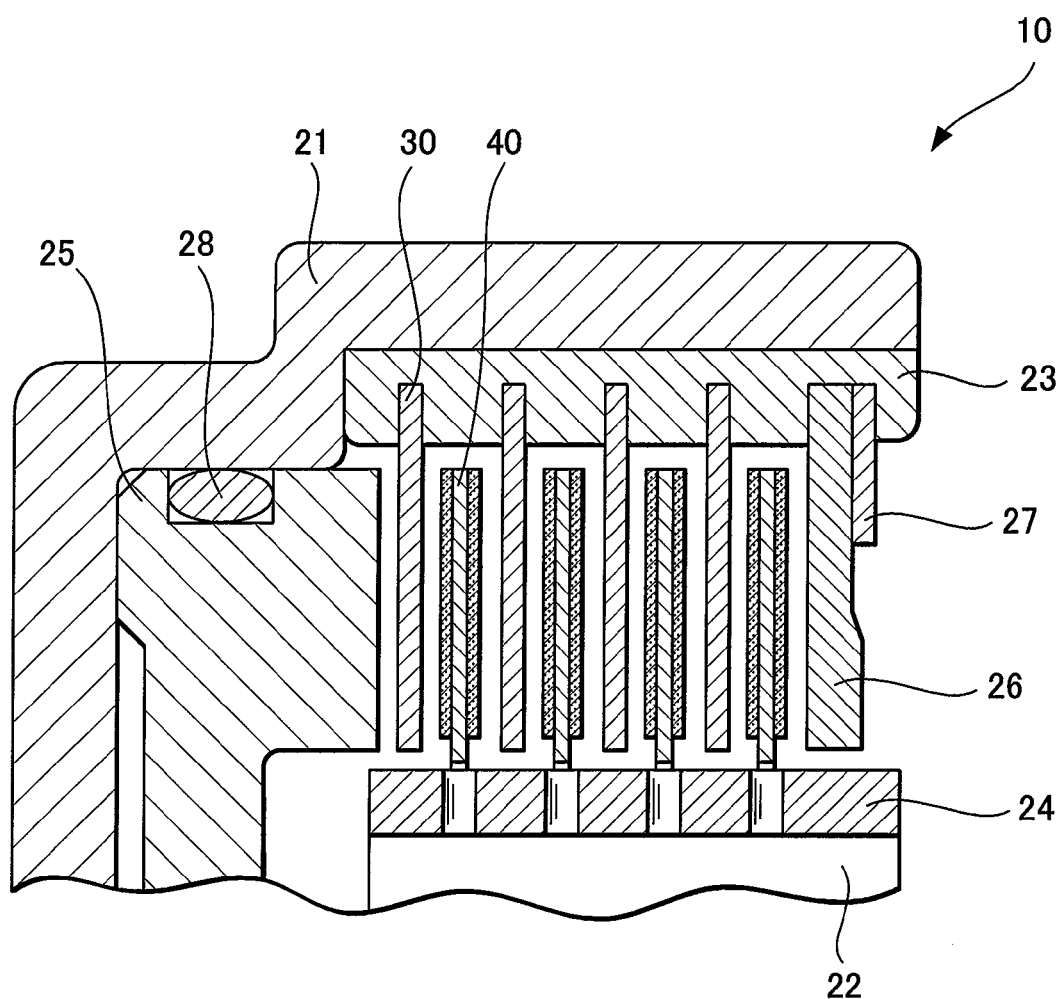
FIG. 1 is a cross-sectional view illustrating the fundamental construction of a wet-type multiplate clutch.
Figure 2:
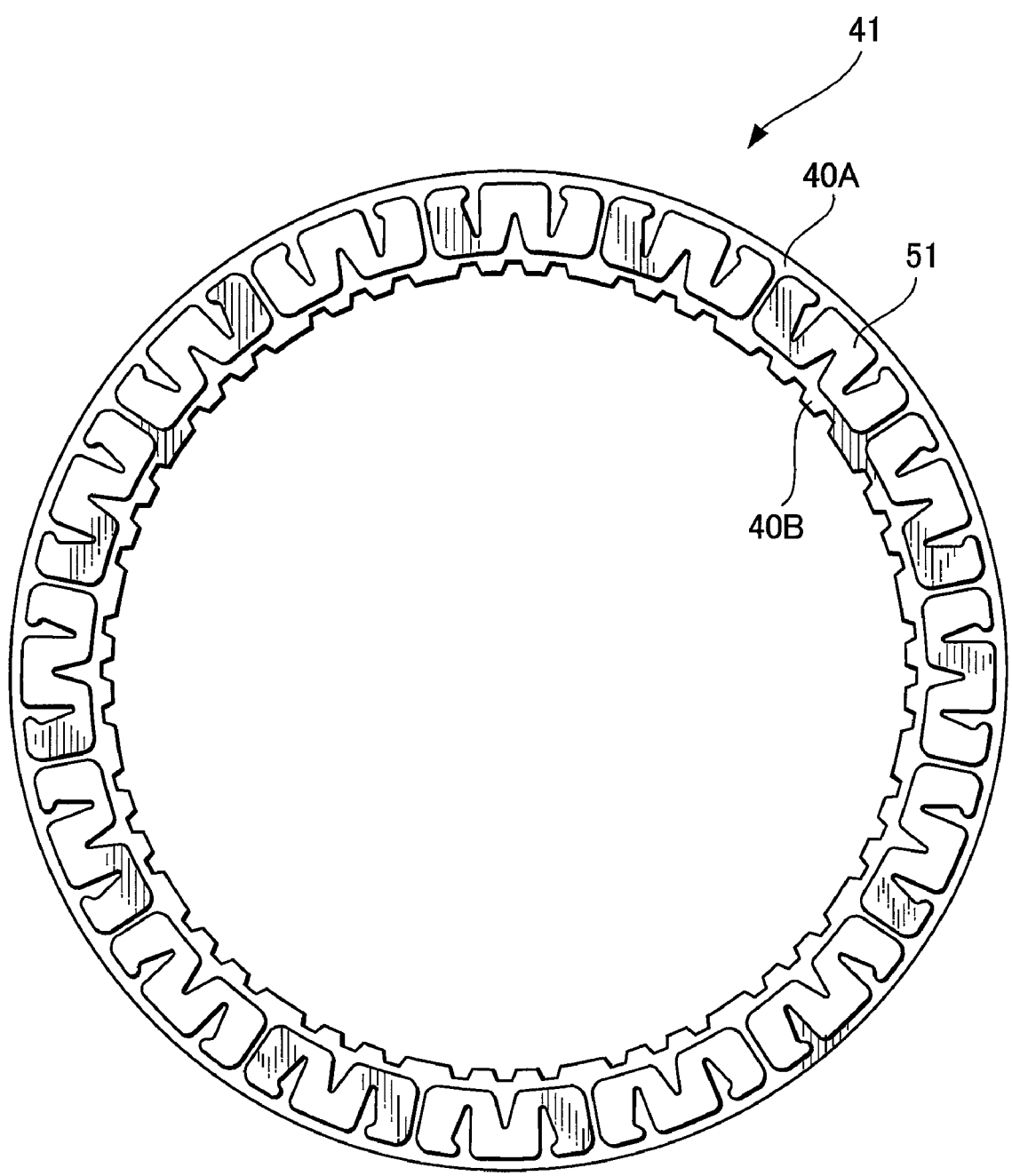
FIG. 2 is a front view of a friction plate according to a first embodiment of the present invention.
Figure 3:
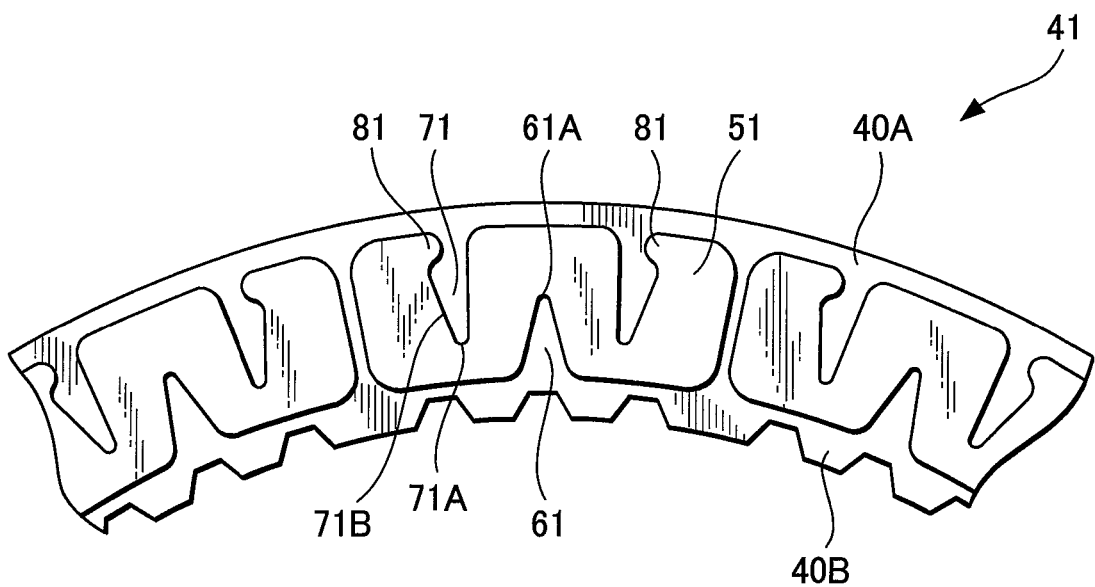
FIG. 3 is an enlarged fragmentary front view of the friction plate of FIG. 2.

Certain preferred embodiments of the present invention will hereinafter be described with reference to the accompanying drawings. FIG. 2 is a front view of a friction plate 41 according to the first embodiment of the present invention. FIG. 3 is an enlarged fragmentary view of the friction plate 41 of FIG. 2, and shows a core plate 40A, segment pieces 51 of a friction lining, and spline teeth 40B to be maintained in fitting engagement with the spline groove 24 formed on the hub 22. Also illustrated are first oil groove 61 opening to a radially-inner side of each segment piece, second oil grooves 71 opening to a radially-outer side of each segment piece, and closed end portions 71A of the second oil grooves 71.

The first oil groove 61 and the second oil grooves 71 each have a radial width which increases from their closed end portion 61A, 71A toward their open end portions. Further, the closed end portion 61A of the first oil groove 61 and the closed end portions 71A of the second oil grooves 71 are located beyond the radial center line of the friction lining. The action and effect of each of the first and second oil grooves can be further enhanced when the first and second oil grooves are constructed as described above.

In the first embodiment of the present invention, the radial width of the open end portion of each second oil groove is made narrower. When the lube oil in the second oil groove is drained to the radially-outer side, fluid resistance is given to the lube oil that passes through the open end portion as the open end portion is made narrower. This fluid resistance produces cushioning effect to prevent grabbing in an initial stage of clutch engagement.

In the first embodiment illustrated in FIGS. 2 and 3, each segment piece 51 is formed in the shape of "W" in the English alphabet by the first oil groove 61 and the second oil grooves 71. Protuberances 81 are formed on angularly-outer side walls 71B of the second oil grooves 71, which are located on opposite sides of the first oil groove 61, respectively, at the open end portions of the second oil grooves 71, so that the open end portions of the second oil grooves 71 are made narrower.

Figure 4:
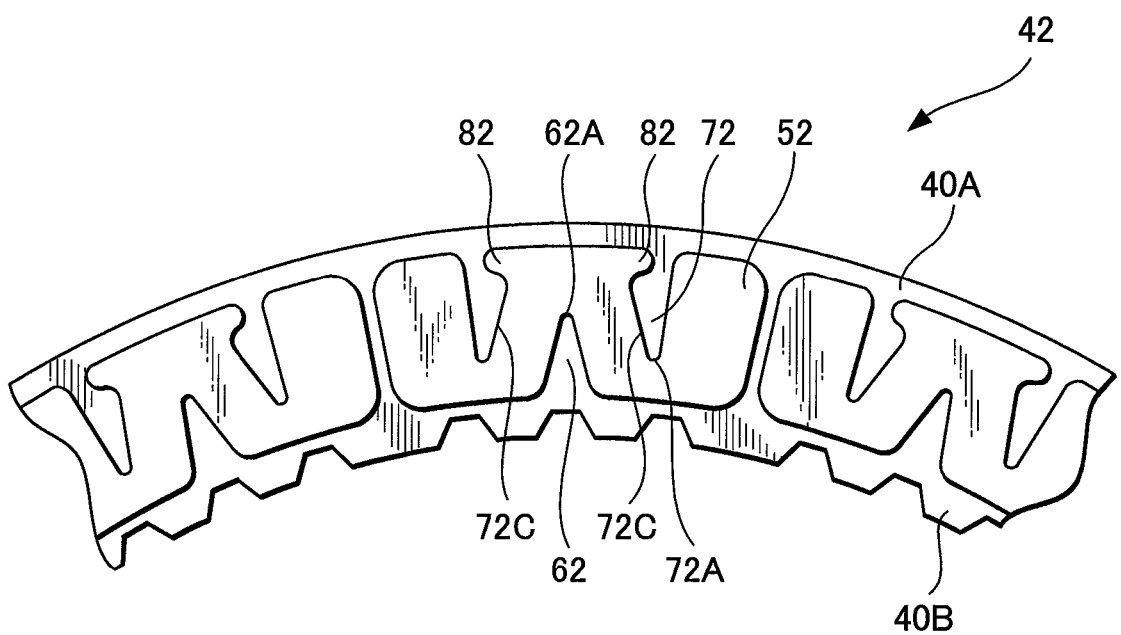
FIG. 4 is similar to FIG. 3, but illustrates a friction plate according to a second embodiment of the present invention.

In a friction plate 42 according to the second embodiment shown in FIG. 4, each segment piece 52 is also in the form of "W", and protuberances 82 are arranged on angularly-inner side walls 72C which are located on the sides opposite to the respective angularly-outer side walls 71B in FIG. 3. These protuberances 82 may be arranged on both the radially-outer and radially-inner side walls at the open end portion of each second oil groove 72, respectively. The arrangement of the protuberance 82 on only one of the radially-outer and radially-inner side walls of each second oil groove 72, however, makes it possible to provide a friction plate, which without an impairment to the draining effect for lube oil during idling, can reduce a drag torque, can effectively exhibit cushioning effect upon clutch engagement and can prevent grabbing in an initial stage of clutch engagement. It is to be noted that in FIG. 4, like reference signs to those of FIGS. 2 and 3 indicate like parts. It is also to be noted that signs 62, 62A and 72A of FIG. 4 correspond to numerals 61, 61A and 71A of FIG. 3, respectively.

As mentioned above, the open end portion of each second oil groove 72 is made narrower by the protuberance 82. When the lube oil in the second oil groove 72 is drained to the radially-outer side upon clutch engagement, fluid resistance is given to the lube oil that passes through the open end portion. This fluid resistance produces cushioning effect to prevent grabbing in an initial stage of clutch engagement.

Figure 5:
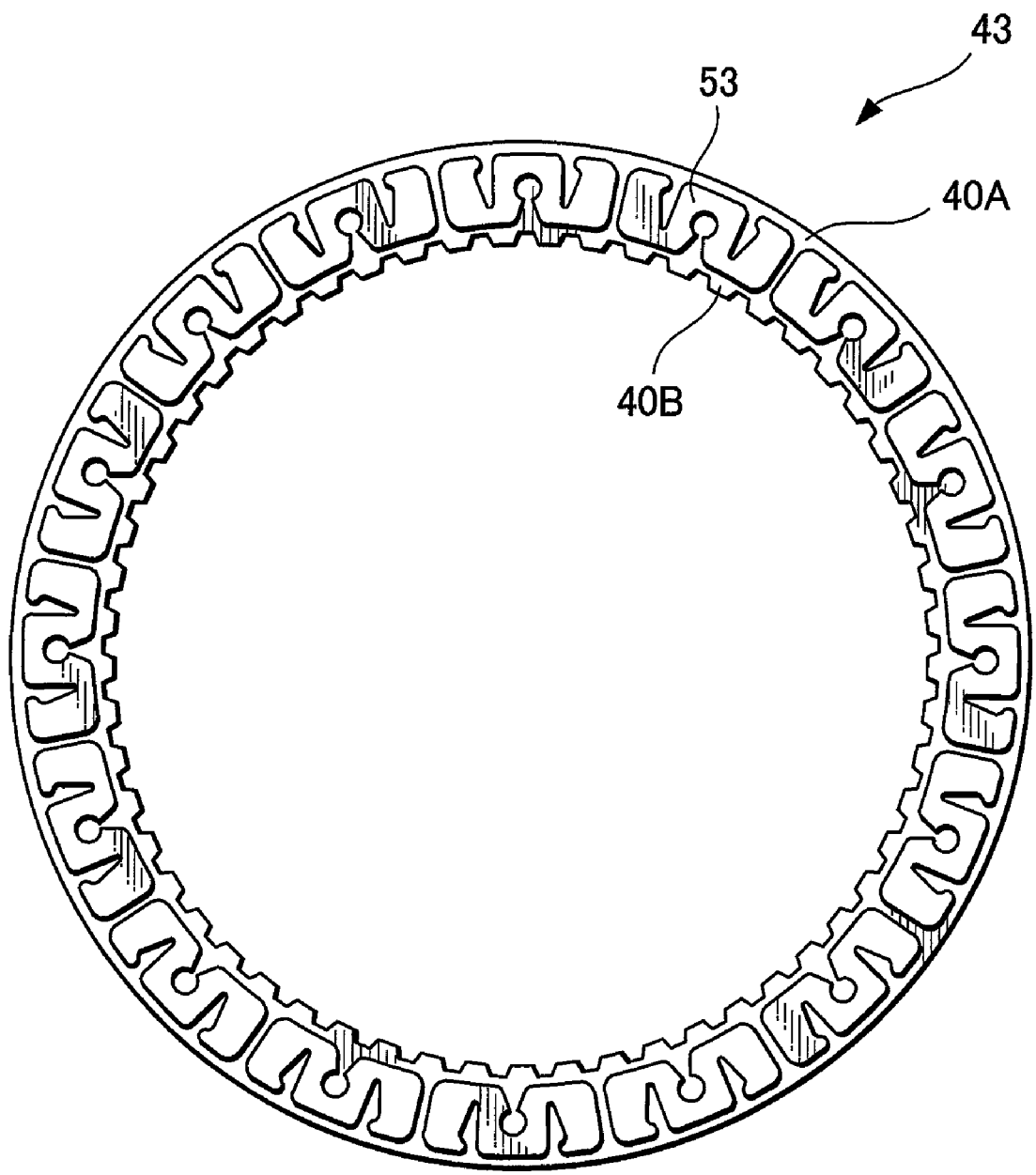
FIG. 5 is a front view of a friction plate according to a third embodiment of the present invention.
Figure 6:
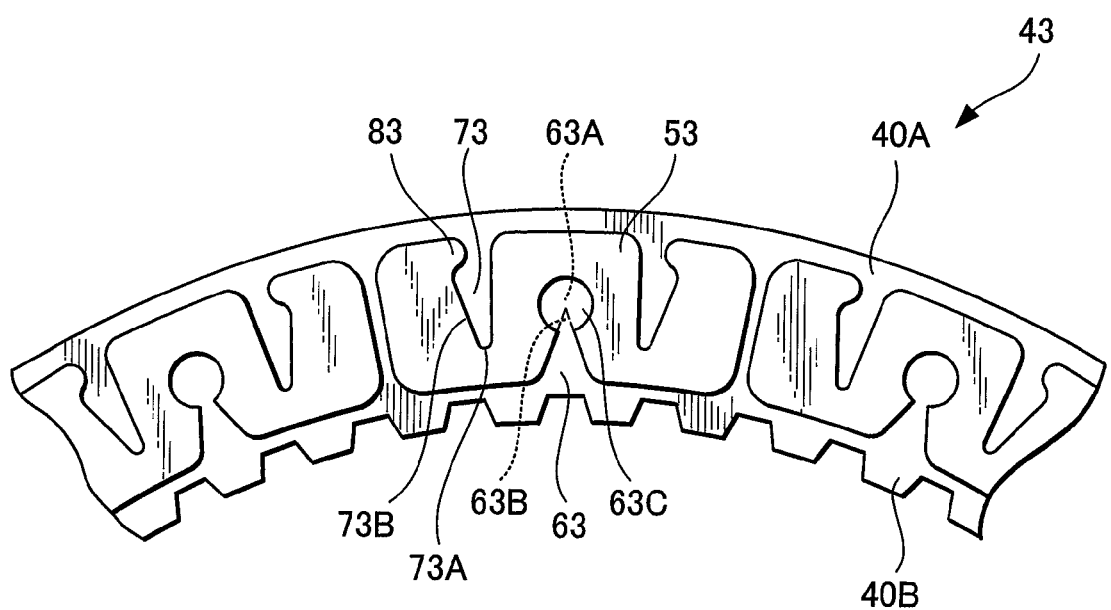
FIG. 6 is an enlarged fragmentary front view of the friction plate of FIG. 5.

FIG. 5 is a front view of a friction plate 43 according to the third embodiment of the present invention. FIG. 6 is an enlarged fragmentary view of the friction plate 43 of FIG. 5, and shows a core plate 40A, segment pieces 53 of a friction lining, and spline teeth 40B to be maintained in fitting engagement with the spline groove 24 formed on the hub 22.

In each segment piece 53, a first oil groove 63 would take such a shape that, in combination with imaginary lines indicated by broken lines 63B, the angular width becomes narrower from its open end portion toward its closed end portion and would have an imaginary closed end portion 63A, if it were not provided with such an oil pocket as required in this embodiment. In this embodiment, a circular oil pocket 63C is formed at the imaginary closed end portion 63A. The lube oil in each oil pocket produces cushioning effect upon clutch engagement, thereby preventing grabbing upon clutch engagement.

In the third embodiment, each segment piece 53 is formed in the shape of "W" in the English alphabet by the first oil groove 63 and two second oil grooves 73. Although the angular width of each second oil groove 73 becomes narrower from its open end portion toward its closed end portion 73A, a protuberance 83 is arranged on an angularly-outer side wall 73b at the open end portion to make narrower the angular width of the open end portion. Fluid resistance is, therefore, given to the lube oil passing through the open end portion to exhibit cushioning effects upon clutch engagement, so that grabbing can be prevented. As described above, the grabbing in an initial stage of clutch engagement can be prevented owing to the cushioning effect of the oil pocket 63C of each first oil groove 63 and the protuberance 83 of each second oil groove 73.

Figure 7:
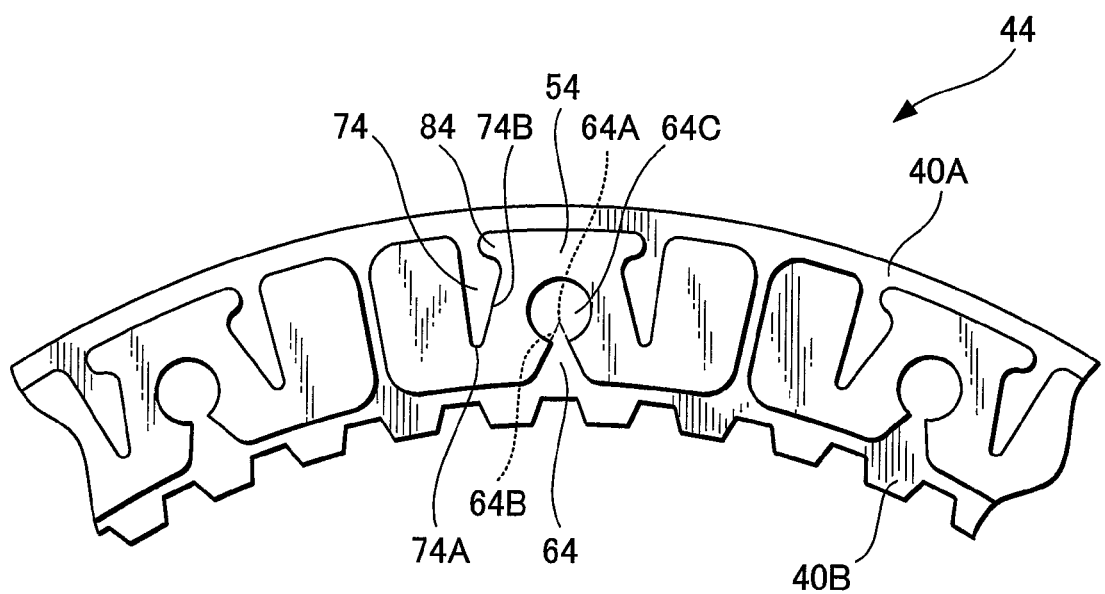
FIG. 7 is similar to FIG. 6, but illustrates a friction plate according to a fourth embodiment of the present invention.

FIG. 7 is similar to FIG. 6, but depicts a friction plate 44 according to the fourth embodiment of the present invention. In FIG. 7, like reference signs to those of FIG. 6 indicate like parts. In each segment 54, a protuberance 84 is formed on an augularly-inner side wall 74B of each second oil groove 74 at its open end portion. It is to be noted that signs 64, 64A, 64B, 64C and 74A of FIG. 7 correspond to signs 63, 63A, 63B, 63C and 73A, respectively.

These protuberances 84 may be arranged on both the radially-outer and radially-inner side walls at the open end portion of each second oil groove 74, respectively. The arrangement of the protuberance 84 on only one of the radially-outer and radially-inner side walls of each second oil groove 74, however, makes it possible to reduce a drag torque during idling and to prevent grabbing in an initial stage of clutch engagement, without an impairment to the draining effect for lube oil.

Figure 8:
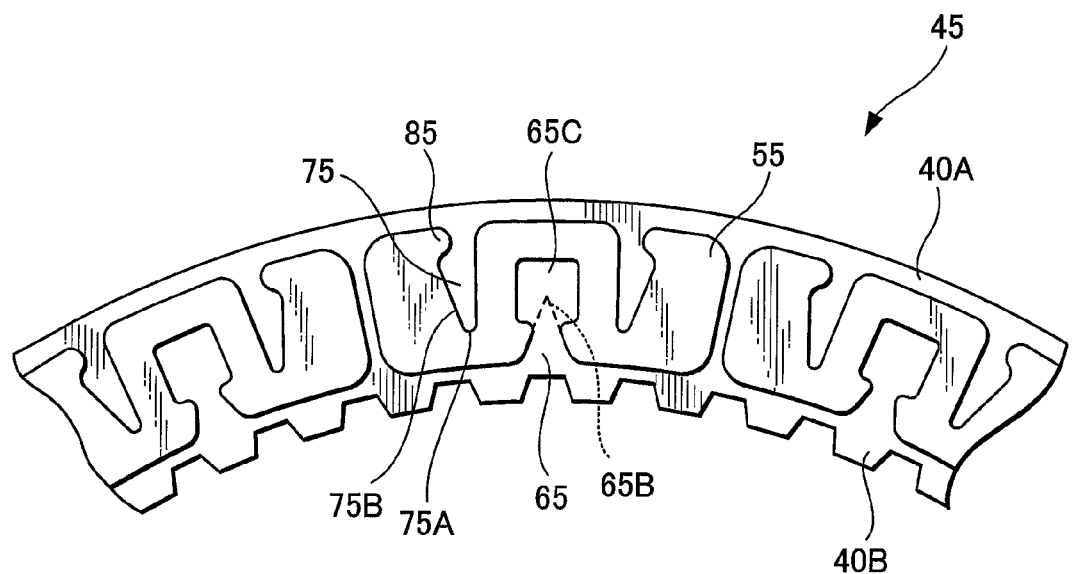
FIG. 8 is similar to FIG. 6, but illustrates a friction plate according to a fifth embodiment of the present invention.

FIG. 8 shows a friction plate 45 according to the fifth embodiment of the present invention. FIG. 8 is similar to FIG. 6 and FIG. 8, but is different from them in that each oil pocket 65C is in a rectangular form. In FIG. 8, like reference signs to those of FIGS. 6 and 7 indicate like parts.

In each segment piece 55, an imaginary closed end portion 65B of each first oil groove 65 and a closed end portion 75A of each second oil groove 75 are located beyond a radial center line of the corresponding segment piece, respectively. When each segment piece 55 is constructed as described above, a flow of lube oil can be improved further. It is to be noted that signs 75B and 85 of FIG. 8 correspond to signs 74B and 83 of FIG. 6.

Figure 9:
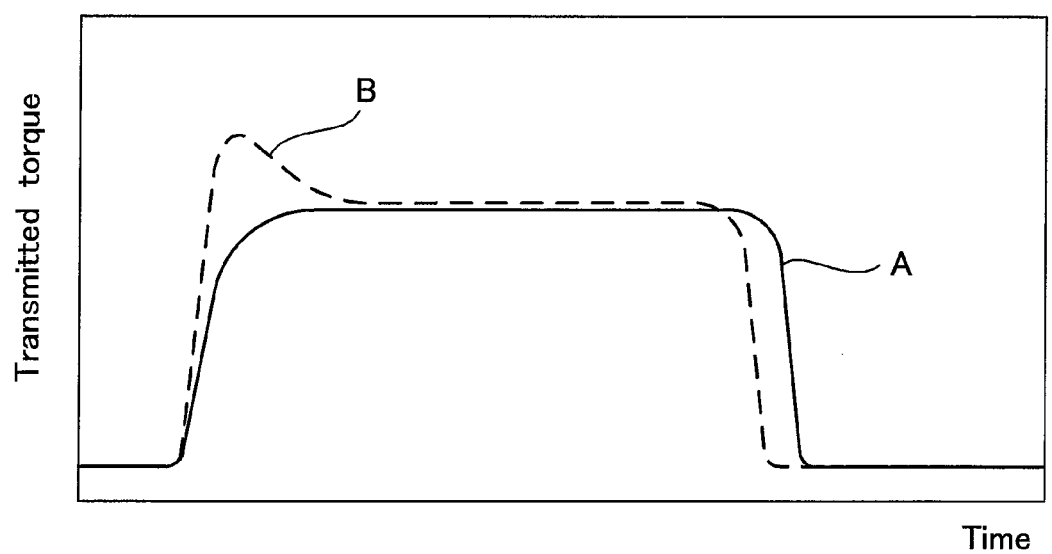
FIG. 9 is a time-torque graph illustrating advantageous effects of friction plates according to the first embodiment of the present invention.

FIG. 9 is a time-torque graph illustrating advantageous effects of the first embodiment of the present invention, in which transmitted torque is plotted along the ordinate while time is plotted along the abscissa. A broken line B shows time-torque characteristics of a conventional clutch, and indicates that grabbing takes place in an initial stage of clutch engagement. A solid line A depicts time-torque characteristics of a clutch equipped with friction plates according to the first aspect of the present invention, and indicates that a torque is transmitted uniformly. A similar time-torque graph can be obtained from a clutch equipped with friction plates according to the second aspect of the present invention.

The invention claimed is:

1. A friction plate for a wet-type multiplate clutch, said friction plate being provided with a core plate and friction linings bonded on opposite sides of said core plate, respectively, each of said friction linings being composed of plural segment pieces bonded at angular intervals on the corresponding one of said opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein:

said second oil groove includes a protuberance that is located at a radially-outer portion of the second oil groove, and the second oil groove narrows from a radially-inner most portion of the protuberance toward the closed end portion of the second oil groove.

2. A friction plate according to claim 1, wherein said second oil groove is provided with said protuberance on one of a radially-outer side wall and a radially-inner side wall to reduce the angular width of said radially-outer portion of the second oil groove.

3. A friction plate according to claim 1, wherein said closed end portion of said first oil groove is located radially outward of a radial center line of the corresponding segment piece, and said closed end portion of said second oil groove is located radially inward of the radial center line of the corresponding segment piece.

4. A friction plate according to claim 1, wherein said segment pieces each have two of said second oil grooves, said first oil groove located intermediate to the two second oil grooves.

5. A friction plate for a wet-type multiplate clutch, said friction plate being provided with a core plate and friction linings bonded on opposite sides of said core plate, respectively, each of said friction linings being composed of plural segment pieces bonded at angular intervals on the corresponding one of said opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein:

said first oil groove is provided with an oil pocket at said closed end portion thereof, said second oil groove includes a protuberance that is located at a radially outer portion of the second oil groove, and the second oil groove narrows from a radially inner most portion of the protuberance toward the closed end portion of the second oil groove.

6. A friction plate according to claim 5, wherein said second oil groove is provided with said protuberance on one of a radially-outer side wall and a radially-inner side wall to reduce the angular width of said radially-outer portion of said second oil groove.

7. A friction plate according to claim 5, wherein the angular width of said first oil groove becomes narrower from an open end portion thereof toward said oil pocket.

8. A friction plate according to claim 5, wherein said oil pocket is circular.

9. A friction plate according to claim 5, wherein said oil pocket is rectangular.

10. A friction plate according to claim 5, wherein said closed end portion of said first oil groove is located radially outward of a radial center line of the corresponding segment piece, and said closed end portion of said second oil groove is located radially inward of the radial center line of the corresponding segment piece.

11. A friction plate according to claim 5, wherein said segment pieces each have two of said second oil grooves, said first oil groove located intermediate to the two second oil grooves.

* * * * *